(12) United States Patent
Brossard et al.

(10) Patent No.: US 10,421,687 B2
(45) Date of Patent: Sep. 24, 2019

(54) SUBSTRATE PROVIDED WITH A STACK HAVING THERMAL PROPERTIES AND A METALLIC TERMINAL LAYER

(71) Applicant: SAINT-GOBAIN GLASS FRANCE, Courbevoie (FR)

(72) Inventors: Sophie Brossard, Minneapolis, MN (US); Nicolas Mercadier, Paris (FR); Ramzi Jribi, Paris (FR); Bertrand Kuhn, Paris (FR); Lorenzo Canova, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 239 days.

(21) Appl. No.: 15/515,477

(22) PCT Filed: Sep. 29, 2015

(86) PCT No.: PCT/FR2015/052590
§ 371 (c)(1),
(2) Date: Mar. 29, 2017

(87) PCT Pub. No.: WO2016/051069
PCT Pub. Date: Apr. 7, 2016

(65) Prior Publication Data
US 2017/0233286 A1    Aug. 17, 2017

(30) Foreign Application Priority Data
Sep. 30, 2014   (FR) ...................................... 14 59258

(51) Int. Cl.
C03C 17/36    (2006.01)
E06B 3/67     (2006.01)
(Continued)

(52) U.S. Cl.
CPC .......... *C03C 17/3649* (2013.01); *C03C 17/36* (2013.01); *C03C 17/366* (2013.01);
(Continued)

(58) Field of Classification Search
CPC ............ C03C 17/3649; C03C 17/3626; C03C 17/3644; C03C 17/3652; C03C 17/366;
(Continued)

(56) References Cited

U.S. PATENT DOCUMENTS 5,935,702 A * 8/1999 Macquart .......... B32B 17/10174
428/336
5,942,338 A    8/1999 Arbab et al.
(Continued)

FOREIGN PATENT DOCUMENTS

WO    2005/115940 A1    12/2005
WO    2009/001143 A1    12/2008
(Continued)

OTHER PUBLICATIONS

International Search Report dated Dec. 22, 2015 in PCT/FR2015/052590 Filed Sep. 29, 2015.

*Primary Examiner* — Donald J Loney
(74) *Attorney, Agent, or Firm* — Oblon, McClelland, Maier & Neustadt, L.L.P.

(57) ABSTRACT

A substrate is coated on one face with a thin-films stack having reflection properties in the infrared and/or in solar radiation including at least one metallic functional layer, based on silver or on a metal alloy containing silver, and at least two antireflection coatings. The coatings each include at least one dielectric layer. The functional layer is positioned between the two antireflection coatings. The stack also includes a terminal layer which is the layer of the stack which is furthest from the face. The terminal layer is a metallic layer consisting of zinc and tin, made of $Sn_xZn_y$,
(Continued)

Figure 1:
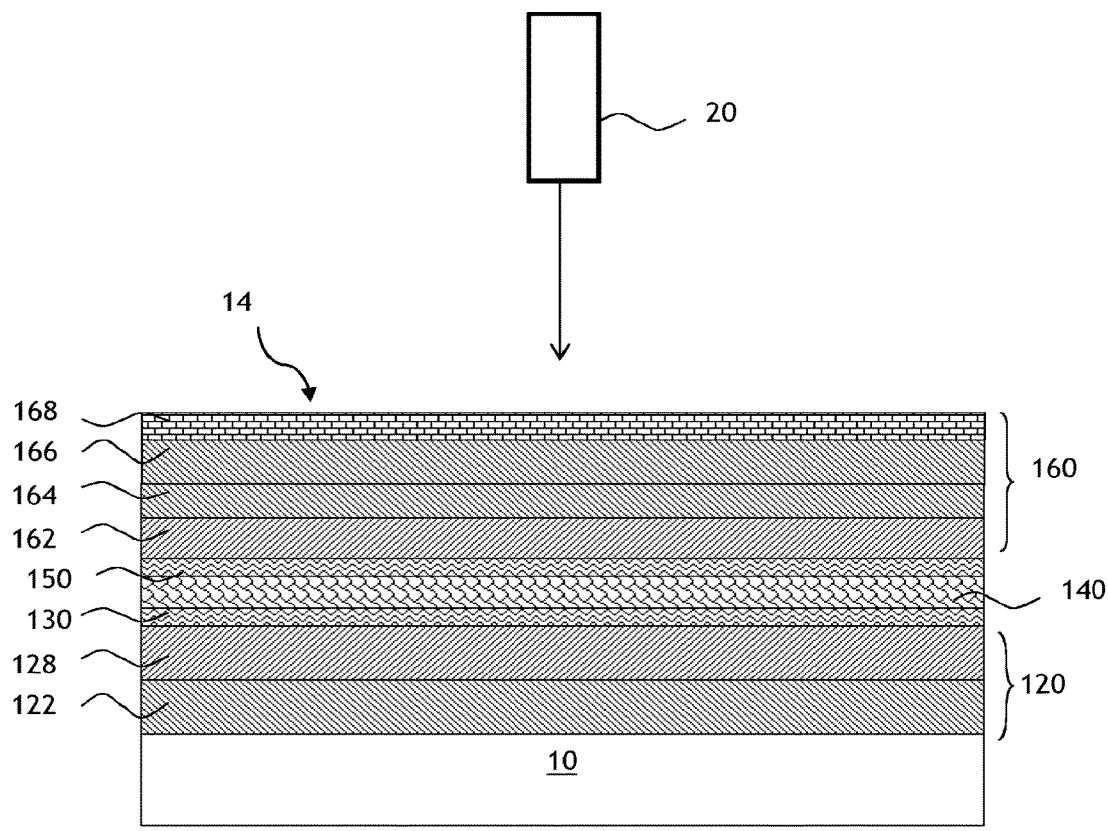

with a ratio of 0.1≤x/y≤2.4 and having a physical thickness of between 0.5 nm and 5.0 nm excluding these values, or even between 0.6 nm and 2.7 nm excluding these values.

16 Claims, 1 Drawing Sheet

(51) Int. Cl.
  *E06B 9/24* (2006.01)
  *E06B 3/66* (2006.01)
  *E06B 3/673* (2006.01)
(52) U.S. Cl.
  CPC ...... *C03C 17/3626* (2013.01); *C03C 17/3644* (2013.01); *C03C 17/3652* (2013.01); *C03C 17/3681* (2013.01); *C03C 17/3689* (2013.01); *E06B 3/6715* (2013.01); *E06B 9/24* (2013.01); *C03C 2217/212* (2013.01); *C03C 2217/216* (2013.01); *C03C 2217/256* (2013.01); *C03C 2217/258* (2013.01); *C03C 2217/27* (2013.01); *C03C 2217/734* (2013.01); *C03C 2218/322* (2013.01); *E06B 3/66* (2013.01); *E06B 3/673* (2013.01); *E06B 2009/2417* (2013.01); *Y02B 80/22* (2013.01)

(58) Field of Classification Search
  CPC ............ C03C 17/3681; C03C 17/3689; C03C 2217/212; C03C 2217/216; C03C 2217/256; C03C 2217/258; C03C 2217/734; C03C 2217/27; E06B 3/6715; E06B 3/66; E06B 3/673; E06B 2009/2417; E06B 9/24; Y02B 80/22
  See application file for complete search history.

(56) References Cited

U.S. PATENT DOCUMENTS

| | | |
|---|---|---|
| 2005/0238923 A1 | 10/2005 | Thiel |
| 2007/0281184 A1 | 12/2007 | Thiel |
| 2010/0136365 A1 | 6/2010 | Unquera et al. |
| 2012/0028009 A1 | 2/2012 | Gerardin et al. |
| 2012/0087005 A1 | 4/2012 | Reymond et al. |
| 2015/0247961 A1 | 9/2015 | Jribi et al. |

FOREIGN PATENT DOCUMENTS

| | | |
|---|---|---|
| WO | 2010/103224 A1 | 9/2010 |
| WO | 2010/142926 A1 | 12/2010 |
| WO | 2014/044984 A1 | 3/2014 |

\* cited by examiner

SUBSTRATE PROVIDED WITH A STACK HAVING THERMAL PROPERTIES AND A METALLIC TERMINAL LAYER

CROSS-REFERENCE TO RELATED APPLICATION

The present application is a national stage application of International Patent Application No. PCT/FR2015/052590, filed Sep. 29, 2015, which claims priority to French Patent Application No. 1459258, filed Sep. 30, 2014, the entire contents and disclosure of each of which is incorporated herein by reference.

The invention relates to a substrate coated on one face with a thin-films stack having reflection properties in the infrared and/or in solar radiation and comprising at least one metallic functional layer, in particular based on silver or on a metal alloy containing silver and at least two antireflection coatings, said coatings each comprising at least one dielectric layer, said functional layer being positioned between the two antireflection coatings, said stack additionally comprising a terminal layer which is the layer of the stack which is furthest from said face.

In this type of stack, the functional layer is thus positioned between two antireflection coatings each comprising, in general, several layers which are each made of a dielectric material of the nitride type, and in particular silicon nitride or aluminum nitride, or of the oxide type. From an optical point of view, the purpose of these coatings which flank the or each metallic functional layer is to "antireflect" this metallic functional layer.

A blocker coating is however inserted sometimes between one or each antireflection coating and the metallic functional layer; the blocker coating positioned beneath the functional layer in the direction of the substrate protects it during an optional high-temperature heat treatment, of the bending and/or tempering type, and the blocker coating positioned on the functional layer on the opposite side from the substrate protects this layer from any degradation during the deposition of the upper antireflection coating and during an optional high-temperature heat treatment, of the bending and/or tempering type.

The invention relates more particularly to the use of a terminal layer of the stack, the one furthest from the face of the substrate on which the stack is deposited, and to the implementation of a treatment of the complete thin-films stack using a source that produces radiation, and in particular infrared radiation.

It is known, in particular from international patent application WO 2010/142926, to provide an absorbent layer as terminal layer of a stack and to apply a treatment after the deposition of a stack in order to reduce the emissivity, or to improve the optical properties, of low-emissivity stacks. The use of a metallic terminal layer makes it possible to increase the absorption and to decrease the power needed for the treatment. As the terminal layer oxidizes during the treatment and becomes transparent, the optical characteristics of the stack after treatment are advantageous (a high light transmission may in particular be obtained).

However, this solution is not completely satisfactory for certain applications due to the inhomogeneity of the sources used for the treatment and/or imperfections of the conveying system, the speed of which is never totally constant.

This results in optical inhomogeneities that are perceptible to the eye (variations in light transmission/reflection and in colors from one point to another).

The objective of the invention is to succeed in overcoming the drawbacks of the prior art, by developing a novel type of stack having one or more functional layers, which stack has, after treatment, a low sheet resistance (and therefore a low emissivity), a high light transmission, and also a uniformity of appearance.

Another important objective is to make it possible to obtain a much more uniform appearance in transmission and in reflection.

Thus, one subject of the invention is, in its broadest sense, a substrate coated on one face with a thin-films stack having reflection properties in the infrared and/or in solar radiation as claimed in claim 1. This stack comprises at least one metallic functional layer, in particular based on silver or on a metal alloy containing silver, and at least two antireflection coatings, said coatings each comprising at least one dielectric layer, said functional layer being positioned between the two antireflection coatings, said stack additionally comprising a terminal layer which is the layer of the stack which is furthest from said face. The substrate coated with the stack is noteworthy in that said terminal layer is a metallic layer consisting of zinc and tin, made of $Sn_xZn_y$, with a ratio of $0.1 \leq x/y \leq 2.4$ and having a physical thickness of between 0.5 nm and 5.0 nm excluding these values, or even between 0.6 nm and 2.7 nm excluding these values.

As is customary, the term "dielectric layer" should be understood in the present invention to mean that, from the point of view of its nature, the material of the layer is "nonmetallic", i.e. is not a metal. In the context of the invention, this term denotes a material having an n/k ratio over the entire visible wavelength range (from 380 nm to 780 nm) equal to or greater than 5.

The term "absorbent layer" should be understood in the present invention to mean that the layer is a material having a mean k coefficient, over the entire visible wavelength range (from 380 nm to 780 nm), of greater than 0.5 and having a bulk electrical resistivity (as known from the literature) of greater than $10^{-6}$ Ω·cm.

It is recalled that n denotes the real refractive index of the material at a given wavelength and the k coefficient represents the imaginary part of the refractive index at a given wavelength, the n/k ratio being calculated at the same given wavelength for both n and k.

The refractive index values indicated in the present document are the values measured as is customary at the wavelength of 550 nm.

The expression "layer based on . . . " should be understood in the present invention to mean that the layer comprises the material mentioned at more than 50 at %.

The expression "metallic layer" should be understood in the present invention to mean that the layer is absorbent as indicated above and that it comprises no oxygen atom or nitrogen atom.

The stack according to the invention thus comprises a final layer ("overcoat"), i.e. a protective layer, deposited in the metallic state from a metallic target and in an atmosphere that comprises neither oxygen, nor nitrogen, introduced deliberately. This layer is oxidized for the most part stoichiometrically in the stack after the treatment using a source that produces radiation and in particular infrared radiation.

Within the meaning of the invention, the fact that the terminal layer consists of tin and zinc means that these two elements represent from 98 to 100% by weight of the target used for depositing the terminal layer (and therefore of the terminal layer thus deposited); it is not excluded for the layer to be able to comprise one or more metallic elements, such as for example aluminum and/or antimony, as a dopant for improving the conduction of the target, or as an impurity.

According to the invention, said metallic terminal layer is preferably made of $Sn_xZn_y$ with an x/y ratio different from 1.

According to the invention, said metallic terminal layer is preferably made of $Sn_xZn_y$ with a ratio of $0.55 \leq x/y \leq 0.83$.

In one particular version of the invention, said terminal layer is located directly on a dielectric layer based on silicon nitride and comprising no oxygen. This dielectric layer based on silicon nitride preferably has a physical thickness of between 10 and 50 nm, or even of between 10 and 30 nm, this layer preferably being made of silicon nitride $Si_3N_4$ doped with aluminum.

In another particular version of the invention, the antireflection coating positioned on top of said metallic functional layer, on the opposite side from said face, comprises a high-index dielectric layer made of a material having a refractive index of between 2.3 and 2.7, this layer preferably being based on an oxide. The refractive index values indicated in the present document are the values measured as is customary at the wavelength of 550 nm.

This high-index layer preferably has a physical thickness of between 5 and 15 nm.

This high-index layer makes it possible to maximize the high light transmission, in the visible range, of the stack and has a favorable action for obtaining neutral colors, both in transmission and in reflection.

In another particular version of the invention, the functional layer is deposited directly on an underblocker coating positioned between the functional layer and the dielectric coating subjacent to the functional layer and/or the functional layer is deposited directly beneath an overblocker coating positioned between the functional layer and the dielectric coating superjacent to the functional layer and the underblocker coating and/or the overblocker coating comprises a thin layer based on nickel or titanium having a physical thickness such that $0.2 \text{ nm} \leq e' \leq 2.5 \text{ nm}$.

The invention also relates to a process for obtaining a substrate coated on one face with a thin-films stack having reflection properties in the infrared and/or in solar radiation and comprising at least one metallic functional layer, in particular based on silver or on a metal alloy containing silver, and two antireflection coatings, comprising the following steps, in the order:

the deposition on one face of said substrate of a thin-films stack having reflection properties in the infrared and/or in solar radiation according to the invention and comprising at least one metallic functional layer, in particular based on silver or on a metal alloy containing silver, and at least two antireflection coatings, then the treatment of said thin-films stack using a source that produces radiation and in particular infrared radiation in an oxygen-containing atmosphere, said x/y ratio of the terminal layer being identical before and after said treatment.

It is also possible to make provision for the use of a metallic terminal layer according to the invention consisting of zinc and tin, made of $Sn_xZn_y$ with a ratio of $0.1 \leq x/y \leq 2.4$ and having a physical thickness of between 0.5 nm and 5.0 nm excluding these values, or even between 0.6 nm and 2.7 nm excluding these values as the layer of the stack which is furthest from said face of the substrate on which the thin-films stack is deposited.

It is also possible to make provision for a multiple glazing comprising at least two substrates which are held together by a frame structure, said glazing providing a separation between an external space and an internal space, wherein at least one intermediate gas-filled space is positioned between the two substrates, one substrate being according to the invention.

Preferably, a single substrate of the multiple glazing comprising at least two substrates or of the multiple glazing comprising at least three substrates is coated on an inner face in contact with the intermediate gas-filled space with a thin-films stack having reflection properties in the infrared and/or in solar radiation.

The glazing then incorporates at least the substrate bearing the stack according to the invention, optionally combined with at least one other substrate. Each substrate may be clear or tinted. One of the substrates at least may in particular be made of bulk-tinted glass. The choice of coloration type will depend on the level of light transmission and/or on the colorimetric appearance that is/are desired for the glazing once its manufacture has been completed.

The glazing may have a laminated structure, in particular combining at Least two rigid substrates of glass type with at least one sheet of thermoplastic polymer, in order to have a structure of the following type: glass/thin-films stack/sheet (s)/glass/intermediate gas-filled space/glass sheet. The polymer may in particular be based on polyvinyl butyral PVB, ethylene/vinyl acetate EVA, polyethylene terephthalate PET or polyvinyl chloride PVC.

Advantageously, the present invention thus makes it possible to produce a thin-films stack having one or more functional layers possessing a low emissivity (in particular $\leq 1\%$) and a high solar factor which has a uniform optical appearance after treatment of the stack using a source that produces radiation and in particular infrared radiation.

Advantageously, the treatment using a source of radiation is not a high-temperature heat treatment of the entire assembly consisting of the substrate and the stack; the substrate is not therefore heat-treated by this treatment using a source of radiation (no bending, tempering or annealing).

Figure 2:
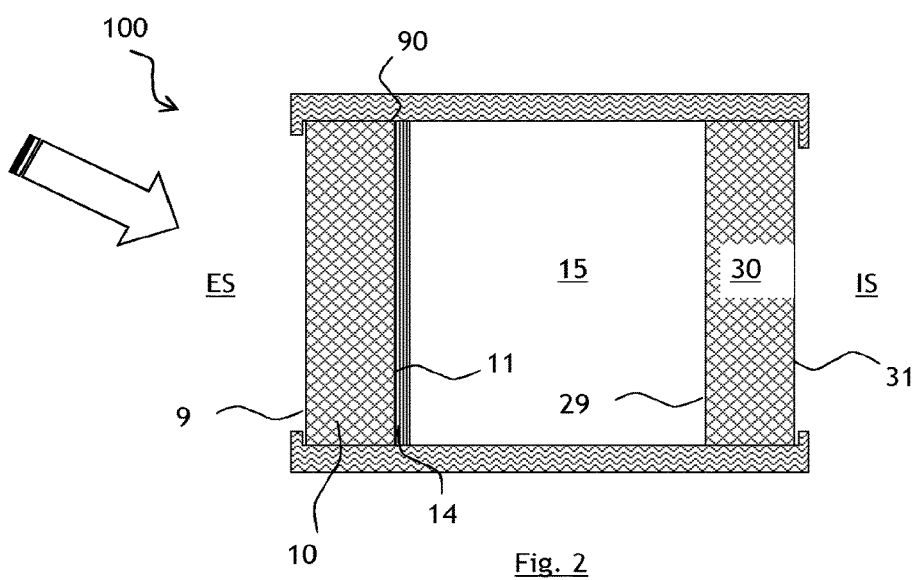

The details and advantageous features of the invention will emerge from the following nonlimiting examples, illustrated by means of the appended figures that illustrate:

in FIG. 1, a stack with a single functional layer according to the invention, the functional layer being deposited directly on an underblocker coating and directly beneath an overblocker coating, the stack being illustrated during the treatment using a source that produces radiation; and in FIG. 2, a double glazing solution incorporating a stack with a single functional layer.

In these figures, the proportions between the thicknesses of the various layers or of the various elements are not rigorously respected in order to make them easier to examine.

FIG. 1 illustrates a structure of a stack 14 with a single functional layer according to the invention deposited on one face 11 of a transparent glass substrate 10, in which the single functional layer 140, in particular based on silver or on a metal alloy containing silver, is positioned between two antireflection coatings, the subjacent antireflection coating 120 located underneath the functional layer 140 in the direction of the substrate 10 and the superjacent antireflection coating 160 positioned on top of the functional layer 140 on the opposite side from the substrate 10.

These two antireflection coatings 120, 160, each comprise at least one dielectric layer 122, 128; 162, 164, 166.

Optionally, on the one hand the functional layer 140 may be deposited directly on an underblocker coating 130 positioned between the subjacent antireflection coating 120 and the functional layer 140 and, on the other hand, the functional layer 140 may be deposited directly beneath an overblocker coating 150 positioned between the functional layer 140 and the superjacent antireflection coating 160.

The underblocker and/or overblocker layers, although deposited in metallic form and presented as being metallic layers, are sometimes in practice oxidized layers since one of their functions (in particular for the overblocker layer) is to oxidize during the deposition of the stack in order to protect the functional layer.

The antireflection coating 160 located on top of the metallic functional layer (or which would be located on top of the metallic functional layer furthest from the substrate if there were several metallic functional layers) is terminated by a terminal layer 168, which is the layer of the stack furthest from the face 11.

When a stack is used in a multiple glazing 100 of double glazing structure, as illustrated in FIG. 2, this glazing comprises two substrates 10, 30 which are held together by a frame structure 90 and which are separated from one another by an intermediate gas-filled space 15.

The glazing thus provides a separation between an external space ES and an internal space IS.

The stack may be positioned on face 2 (on the sheet furthest to the outside of the building when considering the incident direction of the sunlight entering the building and on its face turned toward the gas-filled space).

FIG. 2 illustrates this positioning (the incident direction of the sunlight entering the building being illustrated by the double arrow) on face 2 of a thin-films stack 14 positioned on an inner face 11 of the substrate 10 in contact with the intermediate gas-filled space 15, the other face 9 of the substrate 10 being in contact with the external space ES.

However, it may also be envisaged that, in this double glazing structure, one of the substrates has a laminated structure.

Six examples were carried out on the basis of the stack structure illustrated in FIG. 1 and were numbered from 1 to 6.

For these examples 1 to 6, the antireflection coating 120 comprises two dielectric layers 122, 128, the dielectric layer 122 in contact with the face 11 is a high refractive index Layer and it is in contact with a wetting dielectric layer 128 positioned just beneath the metallic functional layer 140.

In the examples 1 to 6, there is no underblocker coating 130.

The high refractive index dielectric layer 122 is based on titanium oxide; it has a refractive index of between 2.3 and 2.7, and which here is precisely 2.46.

For these examples 1 to 6, the dielectric layer 128 is referred to as a "wetting layer" since it makes it possible to improve the crystallization of the metallic functional layer 140 which here is made of silver, which improves its conductivity. This dielectric layer 128 is made of zinc oxide ZnO (deposited from a ceramic target consisting of 50 at % of zinc and 50 at % of oxygen).

The superjacent antireflection coating 160 comprises a dielectric layer 162 made of zinc oxide (deposited from a ceramic target consisting of 50 at % of doped zinc and 50 at % of oxygen), then a high-index dielectric layer 164, made of the same material as the dielectric layer 122.

The next dielectric layer, 166, is made of the nitride $Si_3N_4$:Al and it is deposited from a metallic target made of Si doped with 8 wt % of aluminum.

For all the examples below, the conditions for depositing the layers are:

| Layer | Target used | Deposition pressure | Gas |
|---|---|---|---|
| $Si_3N_4$:Al | Si:Al at 92:8 wt % | $1.5 \times 10^{-3}$ mbar | Ar/(Ar + $N_2$) at 45% |
| $TiO_2$ | $TiO_2$ | $2 \times 10^{-3}$ mbar | Ar/(Ar + $O_2$) at 90% |
| Ti | Ti | $7 \times 10^{-3}$ mbar | Ar at 100% |
| ZnO | ZnO at 50:50 at % | $2 \times 10^{-3}$ mbar | Ar/(Ar + $O_2$) at 90% |
| $Sn_xZn_y$ | Sn:Zn at 56.5:43.5 wt % | $2 \times 10^{-3}$ mbar | Ar at 100% |
| Ag | Ag | $2 \times 10^{-3}$ mbar | Ar at 100% |

The layers deposited may thus be classed into four categories:

i—layers made of antireflection/dielectric material, having an n/k ratio over the entire visible wavelength range of greater than 5: $Si_3N_4$, $TiO_2$, ZnO ii—metallic layer made of absorbent material, having a mean k coefficient, over the entire visible wavelength range, of greater than 0.5 and a bulk electrical resistivity which is greater than $10^{-6}$ Ω·cm: $Sn_xZn_y$ iii—metallic functional layers made of material having reflection properties in the infrared and/or in solar radiation: Ag iv—underblocker and overblocker layers intended to protect the functional layer against a modification of its nature during the deposition of the stack; their influence on the optical and energy properties is in general ignored.

It was observed that the silver has a ratio 0<n/k<5 over the entire visible wavelength range, but its bulk electrical resistivity is less than $10^{-6}$ Ω·cm.

In all the examples below, the thin-films stack is deposited on a substrate made of clear soda-lime glass having a thickness of 4 mm of the Planilux brand, distributed by SAINT-GOBAIN.

For these substrates,

R indicates the sheet resistance of the stack, in ohms per square;

$A_L$ indicates the light absorption in the visible in %, measured at 2° under the D65 illuminant;

$A_{980}$ indicates the absorption measured specifically at the wavelength of 980 nm, in %, measured at 2° under the D65 illuminant;

V indicates the visibility of the lines; it is a score of 1, 2, 3 or 4, attributed by an operator: the score 1 when no inhomogeneity is perceptible to the eye, the score 2 when localized inhomogeneities, limited to certain regions of the sample, are perceptible to the eye under intense diffuse illumination (>800 lux), the score 3 when localized inhomogeneities, limited to certain regions of the sample, are perceptible to the eye under standard illumination (<500 lux) and the score 4 when inhomogeneities spread over the entire surface of the sample are perceptible to the eye under standard illumination (<500 lux);

$\Delta_{Em}$ constitutes a characterization of the optical inhomogeneity after treatment; it is a variation of color in reflection that is calculated by measuring, in the La*b* system, at 2° under the D65 illuminant, the color in reflection on the stack side every centimeter, in the run direction and sense of the substrate into the chamber for depositing the stack. Thus, for a point x positioned in this direction and a point x+1 located 1 centimeter from x in this same direction and for which the variations of color in reflection on the stack side, $\Delta a^*$, $\Delta b^*$ and $\Delta L$, are calculated:

$$\Delta Em = ((\Delta a^*)^2 + (\Delta b^*)^2 + (\Delta L)^2)^{1/2}$$

In order to be satisfactory, this variation must be less than 0.3.

All these examples make it possible to achieve a low emissivity, of the order of 1%, and a high g factor, of the order of 60%.

Table 1 below illustrates the geometric or physical thicknesses (and not the optical thicknesses) in nanometers, with reference to FIG. 1, of each of the layers of examples 1 to 6:

TABLE 1

| Layer | Material | Ex. 1-6 |
|---|---|---|
| 168 | | variable |
| 166 | $Si_3N_4$:Al | 25 |
| 164 | $TiO_2$ | 12 |
| 162 | ZnO | 4 |
| 150 | Ti | 0.4 |
| 140 | Ag | 13.5 |
| 128 | ZnO | 4 |
| 122 | $TiO_2$ | 24 |

Table 2 below presents the materials tested for the terminal layers 168 of examples 1 to 6, and also the respective thicknesses thereof (in nm):

TABLE 2

| Layer | Ex. 1 | Ex. 2 | Ex. 3 | Ex. 4 | Ex. 5 | Ex. 6 |
|---|---|---|---|---|---|---|
| 168 | $TiO_2$ | $Sn_xZn_y$ | $Sn_xZn_y$ | $Sn_xZn_y$ | Ti | Ti |
| Thickness | 2 | 1.7 | 2.3 | 5 | 2.5 | 3.5 |

The terminal layer 168 of examples 2 and 3 is a metallic layer consisting of zinc and tin, made of $Sn_xZn_y$ with a ratio of $0.1 \leq x/y \leq 2.4$ and having a physical thickness of between 0.5 nm and 5.0 nm excluding these values, and even a physical thickness of between 0.6 nm and 2.7 nm excluding these values.

Table 3 below summarizes the main optical and energy features of these examples 1 to 6, respectively before treatment (BT) and after treatment (AT):

TABLE 3

| | | $A_L$ | $A_{980}$ | R | V | $\Delta_{Em}$ |
|---|---|---|---|---|---|---|
| Ex. 1 | BT | 8.5 | 12.9 | 2.61 | | |
| | AT | 5.7 | 10.1 | 2.04 | 3.5 | 0.30 |
| Ex. 2 | BT | 14.8 | 17.4 | 2.61 | | |
| | AT | 5.7 | 10.4 | 2.03 | 3 | 0.28 |
| Ex. 3 | BT | 23.1 | 25.0 | 2.66 | | |
| | AT | 6.2 | 10.8 | 2.03 | 2 | 0.15 |
| Ex. 4 | BT | 39.3 | 28.5 | 2.55 | | |
| | AT | 7.9 | 9.1 | 1.91 | 4 | 0.35 |
| Ex. 5 | BT | 17.0 | 25.3 | 2.49 | | |
| | AT | 6.4 | 11.5 | 2.0 | 3 | 0.32 |
| Ex. 6 | BT | 31.5 | 45.7 | 2.51 | | |
| | AT | 15.5 | 28.1 | 1.96 | 4 | nc |

The presence of the metallic terminal layer 168 for ex. 2 and 3 gives rise to an increase in the absorption at 980 nm of respectively 4.5% and 12.1% (in absolute values) relative to that of ex. 1 which comprises a dielectric terminal Layer, due to the metallic state of these terminal layers before the treatment.

The treatment consists here of the substrate 10 running at 7 m/min under a laser line 20 having a width of 45 μm and a power of 25 W/mm with the laser line oriented perpendicular to the face 11 and in the direction of the terminal layer 168, i.e. by positioning the laser line (illustrated by the straight black arrow) above the stack and by orienting the laser in the direction of the stack, as seen in FIG. 1.

The treatment reduces the emissivity of the stack by around 4%.

After treatment and oxidation of the terminal layer 168, ex. 2 and 3 have a sheet resistance and a light absorption that are identical to those of ex. 1 after treatment, but are optically more uniform, with a visibility of the lines V, equal to or less than 3.

If the thickness of the terminal layer is too great (ex. 4) the lines become too visible, with a visibility V of greater than 3. A residual absorption remains after treatment and this absorption is itself non-uniform.

If the metallic terminal layer 168 is chosen to be made of titanium (ex. 5 and 6) instead of $Sn_xZn_y$, the absorption of the stack before laser treatment is increased and the power required for the treatment is consequently decreased. The terminal layer oxidizes as fully in the laser treatment and the absorption of the stack is identical to the absorption of the reference stack.

On the other hand, the stack has a lined appearance when it is observed in reflection on the layer side.

For ex. 2 and 3, it was observed that the metallic terminal layer oxidizes rapidly once a threshold temperature is reached. The absorption then decreases so that the temperature reaches a ceiling. The temperature reached and the heating time are thus regulated by the oxidation and are no longer influenced by the fluctuations of the incident luminous flux.

It is likely that the terminal layer of ex. 2 and 3 acts as a barrier that prevents the migration of atmospheric oxygen into the stack and limits the development of the optical properties of the lower layers.

Moreover, the fact that the terminal layer 168 made of $Sn_xZn_y$ is located directly on a dielectric Layer based on silicon nitride and comprising no oxygen probably participates in the optical stability due to the similarity of the refractive indices of the oxidized $Sn_xZn_y$ and of the silicon nitride.

A terminal layer deposited from a target made of Sn:Zn:Sb at 30:68:2 wt % was also tested and gave similar results.

The present invention may also be used for a thin-film stack having several functional layers. The terminal layer according to the invention is the layer of the stack which is furthest from the face of the substrate on which the stack is deposited.

The present invention is described in the preceding text by way of example. It will be understood that a person skilled in the art will be able to realize different variants of the invention without otherwise departing from the scope of the patent as defined by the claims.

The invention claimed is:

1. A substrate coated on one face with a thin-films stack having reflection properties in the infrared and/or in solar radiation and comprising at least one metallic functional layer and at least two antireflection coatings, said coatings each comprising at least one dielectric layer, said functional layer being positioned between the two antireflection coatings, said stack additionally comprising a terminal layer which is the layer of the stack which is furthest from said face, wherein said terminal layer is a metallic layer consisting of zinc and tin, made of $Sn_xZn_y$ with a ratio of $0.55 \leq x/y \leq 0.83$ and having a physical thickness of between 0.5 nm and 5.0 nm excluding these values.

2. The substrate as claimed in claim 1, wherein said terminal layer is located directly on a dielectric layer based on silicon nitride and comprising no oxygen.

3. The substrate as claimed in claim 2, wherein said dielectric layer based on silicon nitride has a physical thickness of between 10 and 50 nm.

4. The substrate as claimed in claim 2, wherein said antireflection coating positioned on top of said metallic functional layer, on the opposite side from said face, comprises a high-index dielectric layer made of a material having a refractive index of between 2.3 and 2.7.

5. The substrate as claimed in claim 4, wherein said high-index dielectric layer has a physical thickness of between 5 and 15 nm.

6. A multiple glazing comprising:
at least two substrates which are held together by a frame structure, said glazing providing a separation between an external space and an internal space, wherein at least one intermediate gas-filled space is positioned between the two substrates, one of the two substrates being the substrate as claimed in claim 1.

7. A process for obtaining a substrate coated on one face with a thin-films stack having reflection properties in the infrared and/or in solar radiation and comprising at least one metallic functional layer and at least two antireflection coatings, the process comprising in the following order:
depositing on one face of said substrate the thin-films stack having reflection properties in the infrared and/or in solar radiation and comprising the at least one metallic functional layer and the at least two antireflection coatings to form the substrate as claimed in claim 1,
treating said thin-films stack with a source that produces radiation, said x/y ratio of the terminal layer being identical before and after said treating.

8. The substrate as claimed in claim 1, wherein the metallic functional layer is based on silver or on a metal alloy containing silver.

9. The substrate as claimed in claim 1, wherein the physical thickness is between 0.6 nm and 2.7 nm excluding these values.

10. The substrate as claimed in claim 2, wherein said dielectric layer based on silicon nitride has a physical thickness of between 10 and 30 nm.

11. The substrate as claimed in claim 3, wherein said antireflection coating positioned on top of said metallic functional layer, on the opposite side from said face, comprises a high-index dielectric layer made of a material having a refractive index of between 2.3 and 2.7.

12. The substrate as claimed in claim 11, wherein said high-index dielectric layer has a physical thickness of between 5 and 15 mn.

13. The substrate as claimed in claim 11, wherein the high-index dielectric layer is based on an oxide.

14. The substrate as claimed in claim 4, wherein the high-index dielectric layer is based on an oxide.

15. The process as claimed in claim 7, wherein the at least one metallic functional layer is based on silver or on a metal alloy containing silver.

16. The process as claimed in claim 7, wherein the radiation produced in the treating is infrared radiation.

* * * * *